(12) United States Patent
Shih

(10) Patent No.: US 6,490,637 B1
(45) Date of Patent: Dec. 3, 2002

(54) SYSTEM AND METHOD FOR DYNAMIC ASSIGNMENT OF UNIQUE SERIAL NUMBER TO SYSTEM DEVICE

(75) Inventor: Liang-Kuang Shih, Irvine, CA (US)

(73) Assignee: Conexant Systems Inc., Newport Beach, CA (US)

( * ) Notice: Subject to any disclaimer, the term of this patent is extended or adjusted under 35 U.S.C. 154(b) by 0 days.

(21) Appl. No.: 09/379,994

(22) Filed: Aug. 24, 1999

(51) Int. Cl.[7] .......................... G06F 13/00; G06F 13/10
(52) U.S. Cl. ................ 710/8; 710/10; 710/15; 710/16; 710/19; 713/1
(58) Field of Search ................ 710/8, 10, 15, 710/19, 16; 713/1

(56) References Cited

U.S. PATENT DOCUMENTS

| | | | | |
|---|---|---|---|---|
| 4,773,005 A | * | 9/1988 | Sullivan | ............... 364/200 |
| 5,311,424 A | * | 5/1994 | Mukherjee et al. | ......... 364/401 |
| 5,717,687 A | * | 2/1998 | Minot et al. | ............... 370/257 |
| 5,787,174 A | * | 7/1998 | Tuttle | ............................ 380/23 |
| 5,812,589 A | * | 9/1998 | Sealander et al. | .......... 375/200 |
| 6,263,059 B1 | * | 7/2001 | Asai | ............................ 379/142 |

* cited by examiner

Primary Examiner—Jeffrey Gaffin
Assistant Examiner—Rehana Perveen
(74) Attorney, Agent, or Firm—Conexant Systems

(57) ABSTRACT

A method and system for assigning during configuration of a computer device a unique serial number is disclosed. The method uses firmware embedded within the device which when first initialized executes code for assigning and storing a unique serial number by use of a random number generator. In one embodiment, the unique serial number is generated based on the device's internal clock. Based on the amount of bit space typically reserved for a device's serial number, the number of combinations are great enough to make the serial number unique by use of a random number. Once the serial number is stored in the devices embedded firmware a random number is never generated again.

29 Claims, 3 Drawing Sheets

SYSTEM AND METHOD FOR DYNAMIC ASSIGNMENT OF UNIQUE SERIAL NUMBER TO SYSTEM DEVICE

BACKGROUND OF THE INVENTION

1. Technical Field

The present invention relates in general to a method and system for configuring computer devices, and more particularly, to a system and method for identifying and configuring computer devices requiring unique serial numbers.

2. Description of the Related Art

The use of computers, especially personal computers (PCs) is widespread. The computing power of the PC, whether coupled to a network or operating as a stand-alone device has increased significantly as new computer designs move into production. As a result, the installation and setup of a computer requires many different components or devices to handle the variety of functionality offered by today's computers. Also, before the computer system is shipped these different components or devices may be assigned a unique serial number stored within that component or device.

The assigning of a unique serial number may be required for communication identification for some devices in accordance with industry standard specifications. Also, having more than one device plugged into the personal computer requires the operating system to have a way (using the serial number) to differentiate between the devices. Currently, the device firmware is a binary program that is burned to flash memory or EPROM in the device. Therefore, the firmware needs to be changed for every device to include a unique serial number resulting in the time required to burn in a unique serial number for each component time consuming and costly.

Consequently, it would be desirable to provide an improved method and system that uses the same firmware burned into each device yet has the capability of providing a unique serial number without having to modify the firmware each time. The subject invention herein solves all of these problems in a new and unique manner that has not been part of the art previously.

SUMMARY OF THE INVENTION

The present invention is embodied in a method and system for assigning during configuration a unique serial number for a computer device. The method uses firmware embedded within the device which when first initialized executes code for assigning and storing a unique serial number by use of a random number generator. In one embodiment, the unique serial number is generated based on the device's internal clock. Based on the amount of bit space typically reserved for a device's serial number, the number of combinations are great enough to make the serial number unique by use of a random number. Once the serial number is stored in the devices embedded firmware a random number is never generated again.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
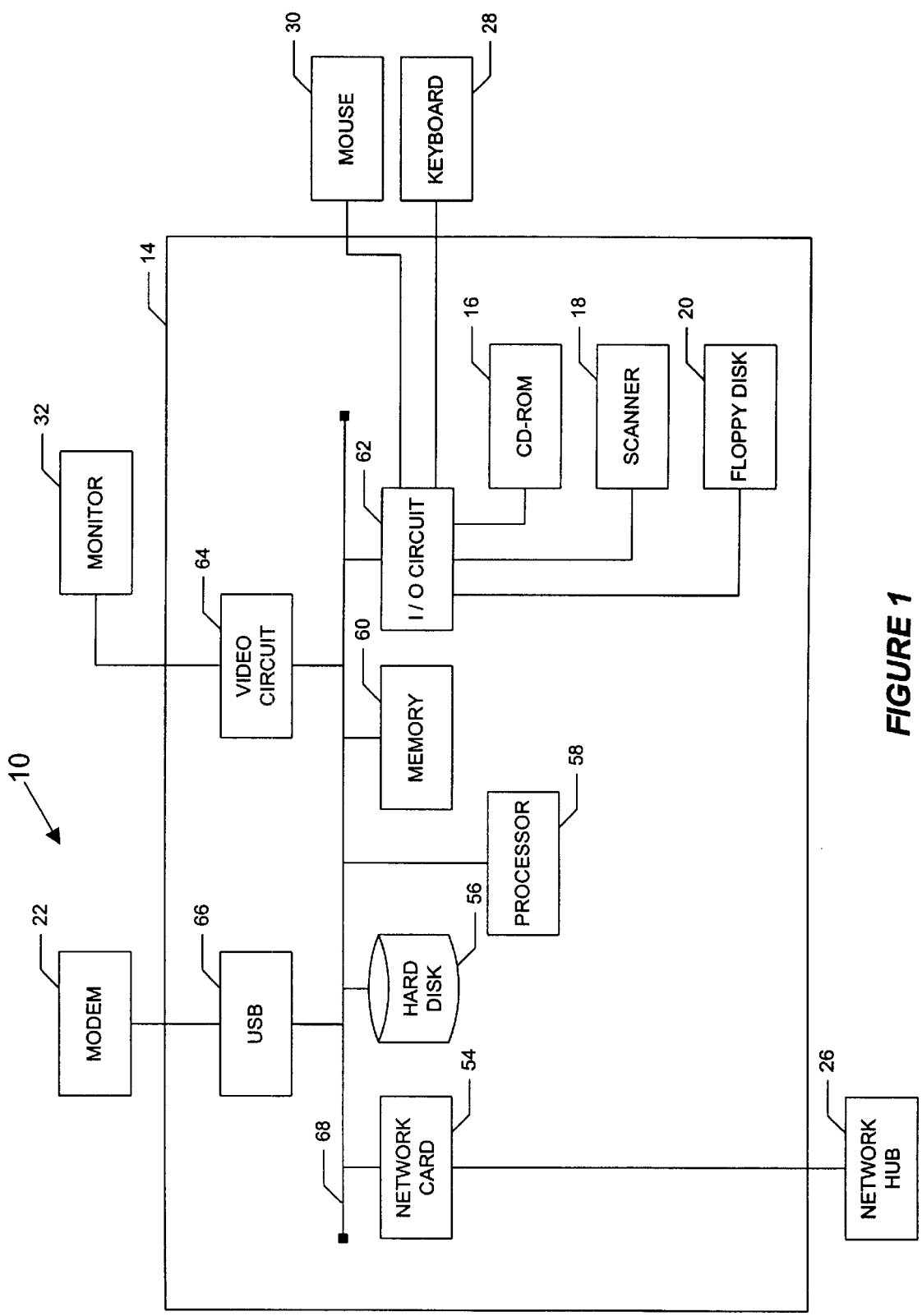
FIG. 1 depicts a high-level block diagram of a computer system, for use in a computer network.

With reference now to the figures and in particular with reference to FIG. 1, there is illustrated a functional block diagram of a computer system 10, for use in a computer network. The computer 14 comprises a hard disk 56 for storing programs and data, a processor 58 for executing programs and a memory 60 for temporarily holding the programs or data executed by the processor 58. A network card 54 is provided for connecting a network hub 26 and an I/O circuit 62 for connecting various peripherals such as CD-ROM 16, scanner 18, floppy disk 20, keyboard 28 and mouse 30. Still referring to FIG. 1, a video circuit 64 is shown for connecting the monitor 32, a USB (universal serial bus) circuit 66 for connecting the modem 22 and an internal bus 68 for connecting all internal components of computer 14 such as network card 54, hard disk 56, processor 58, memory 60, I/O circuit 62, video circuit 64 and USB circuit 66. The internal bus 68 can be an ISA (industrial standard architecture) bus or other industrial standard buses such as USB 66.

Before the computer system is shipped for purchase by a consumer, some of the above described components or devices in FIG. 1 may be assigned a unique serial number stored within that component or device and typically is assigned by an OEM (original equipment manufacture). Also, the assigning of a unique serial number is required for communication identification for some devices in accordance with industry standard specifications (such as the USB 66 specification). These devices typically include the modem 22, mouse 30, and keyboard 28 as well as internal devices such as the scanner 18 and CD-ROM 16. However, the time required to burn in a unique serial number for each component is time consuming and costly at the OEM site. Therefore, in accordance with the teachings of the present invention, a method is presented wherein each device has embedded coded firmware that when initialized creates and saves a unique serial number in accordance with the industry standard that governs installation of that component or device.

Figure 2:
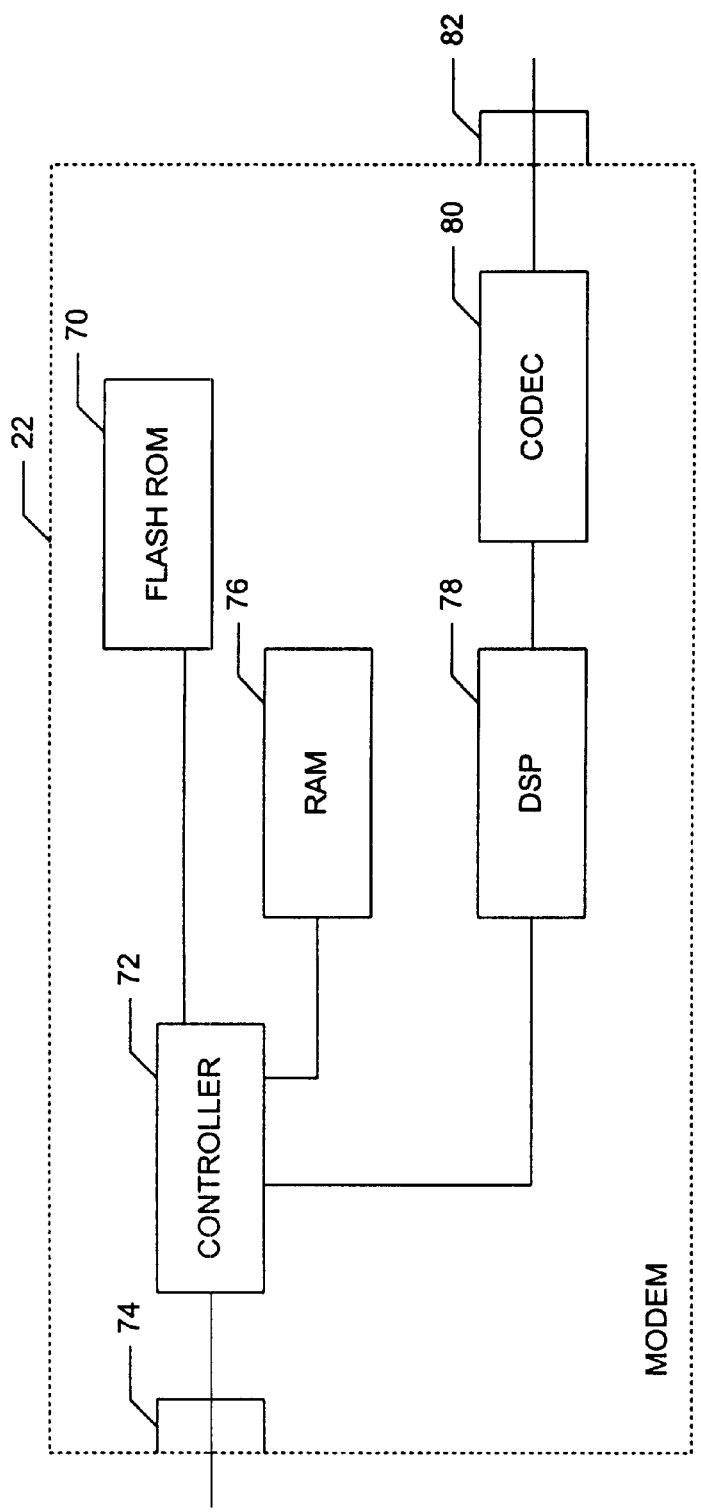
FIG. 2 depicts a modem according to one embodiment of the present invention.
Figure 3:
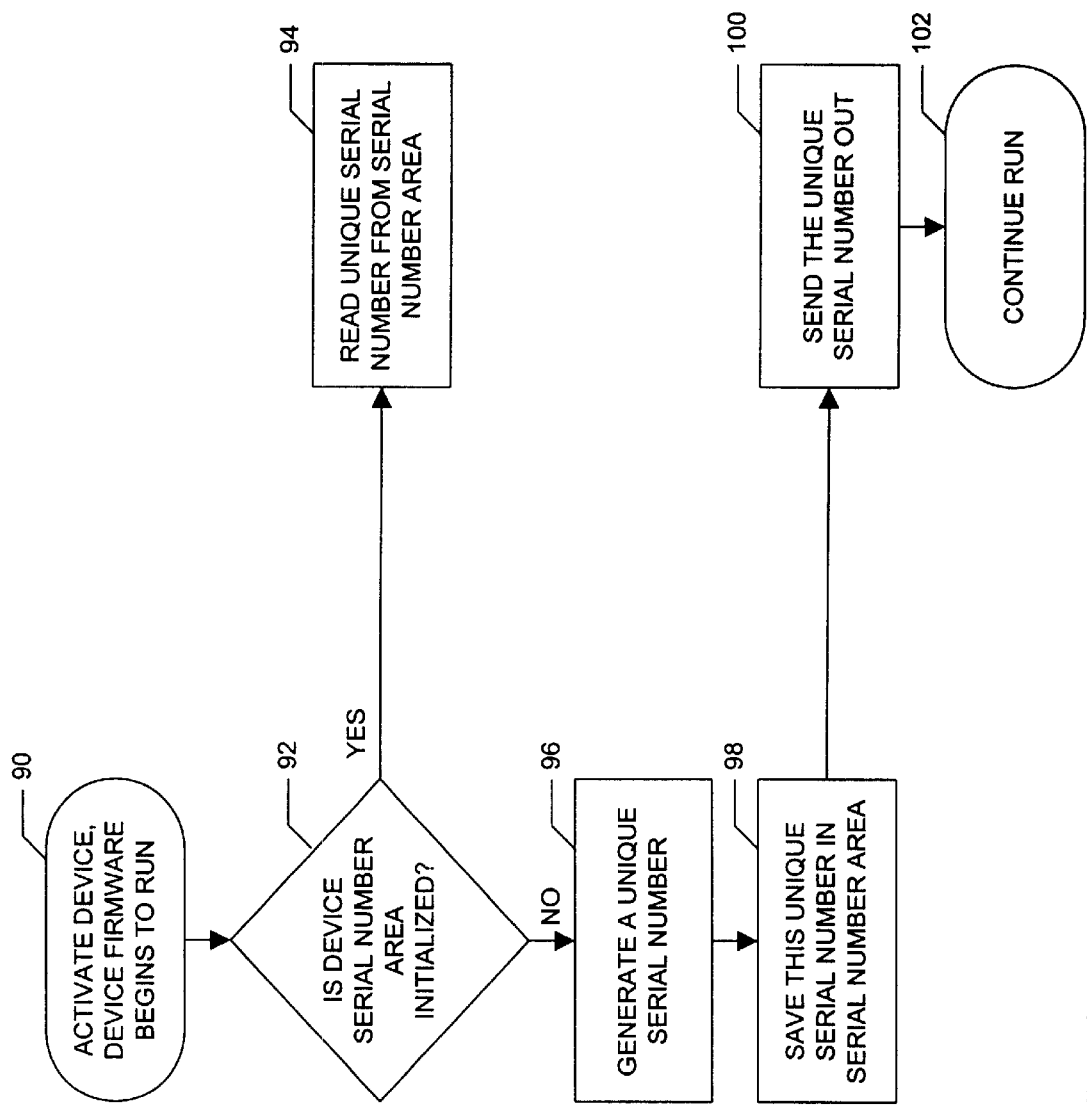
FIG. 3 is a flow diagram depicting the method of assigning device identification in accordance with the present invention.

Referring now to FIG. 2, shown is a typical data modem 22 in which a method according to the present invention would be implemented. It should be understood that the modem 22 is by way of example and not of limitation and that any device may use the invention as described below. Referring to FIG. 3 a flow diagram depicting the method of assigning device identification is shown. According to the method depicted in FIG. 3, in step 90, the modem 22 is activated or initialized. Upon initialization, the modem 22 runs an execution code embedded within a flash ROM 70, within the modem 22. The execution code contains information necessary for standard operation of the modem 22. For example, the modem execution code typically contains startup and initialization code operating upon initial startup of the modem 22.

Still referring to FIG. 2, execution of the modem 22 code is performed by a modem controller 72, which is typically an embedded micro-controller. In normal operation, the modem controller 72 executes code from the flash ROM 70 into a volatile RAM 76, and executes the code out of the RAM 76. This code provides for operation of the modem 22 responsive to commands and data received from the computer system over an interface 74, and controls a DSP 78 and CODEC 80 which connect to a phone line or cellular phone through a second interface 82. Other hardware arrangements are possible without detracting from the spirit of the invention. For example, although the modem controller 72 and the DSP 78 are shown as two devices, it is also possible to combine their functionality in a single digital signal processor.

FIG. 3 illustrates the steps taken for determining, and if needed, assigning a unique serial number for the modem 22. After the firmware or execution code in flash ROM 70 begins to run, from step 92, the initialization routine determines if within the ROM 70 a serial number area has been initialized. If in step 92 the serial number area is initialized the unique serial number is read from its location in the flash ROM 70 as shown in step 94. Next, in step 100 the unique serial number is sent out to the micro-controller 72 and the initialization routine continues to run in step 102.

Still referring to FIG. 3, if the serial number area in step 92 has not been initialized, the process proceeds to step 96 wherein a unique serial number is generated. This unique serial number may be generated by any type of technique or algorithm known for generating a random number in the probability arts. In one preferred embodiment the system clock (not shown) of the device may be used to generate the unique serial number. As an example, for a modem conforming to a USB standard, 16 bytes (128 bits) are allocated for the serial number area in the flash ROM 70. By correlating the time of the system clock which is in Mhz to a unique serial number by any number of translations schemas a unique serial number is created. It should be understood that due to the small increments of time utilized by the system clock in devices, creating the same unique serial number for similar devices on different computer systems is infinitesimal. After the unique serial number is created it is stored in the serial number area of the flash ROM 70, as shown in step 98. Next, in step 100 the unique serial number is sent out to the micro-controller 72 and the initialization routine continues to run in step 102.

Therefore, in accordance with the present invention, device firmware when first initialized assigns and stores a unique serial number by use of a random number generator. Also, based on the amount of bit space typically reserved for the serial number, the number of combinations are great enough to make the serial number unique, especially when generating the random number based on the device's internal clock. Once the unique serial number is stored in flash ROM 70, the number never needs to be generated again. By using the same firmware in accordance with the present invention, burning in a serial number at the production level may be avoided whereby installing a single small piece of executable code saves manufacturing cost. It should be understood, that the method, although shown for a modem may be used for any computer device having embedded firmware needing a unique serial number.

It is also important to note that although the present invention has been described in the context of embedded firmware for computer devices when performing initialization routines, those skilled in the art will appreciate that the mechanisms of the present invention are capable of being distributed as a program product in a variety of forms to any type of information handling system, and that the present invention applies equally regardless of the particular type of signal bearing media utilized to actually carry out the distribution. Examples of signal bearing media include, without limitation, recordable type media such as floppy disk or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A computer implemented method for dynamically assigning a unique serial number to a device communicatively coupled with a computer system, the method comprising:

examining a serial number storage area located within the device to determine if a unique serial number has been established for the device;

responsive to a determination that no unique serial number has been established, generating a unique serial number based on a system clock associated with the device;

storing the serial number in the serial number storage area, wherein the serial number storage area is contained in a non volatile memory and the serial number is thereafter used by the device for communication within the computer system; and sending the serial number to a controller located within the device.

2. The method for device communication identification according to claim 1, wherein determining if the device has the serial number area initialized further comprises the step of:

executing code embedded in firmware located within the device.

3. The method for device communication identification according to claim 1, further comprising the step of:

storing the unique serial number in flash ROM located within the device.

4. The method for device communication identification according to claim 1, further comprising the step of:

utilizing a modem as the device whereby the modem conforms to a USB standard.

5. The method for device communication identification according to claim 1, farther comprising the step of:

responsive to a determination that the serial umber area is initialized reading a unique serial number from the serial number area and sending the unique serial number to a controller located within the device.

6. A system for device communication identification comprising:

means for determining if a device has a serial number area initialized, and means for generating and storing a unique serial number in the serial number area when the serial number area is not initialized, wherein the serial number is thereafter used by the device for communication within the computer system.

7. The system for device communication identification according to claim 6, further comprising:

means for generating the unique serial number using a random number generator.

8. The system for device communication identification according to claim 6, further comprising:
means for generating the unique serial number using an internal clock located within the device.

9. The system for device communication identification according to claim 6, further comprising:
means for determining if the device has the serial number area initialized by executing code embedded in firmware located within the device.

10. The system for device communication identification according to claim 6, further comprising:
means for storing the unique serial number in flash ROM located within the device.

11. The system for device communication identification according to claim 6, further comprising:
means for generating and storing a unique serial number utilizing a modem conforming to a USB standard.

12. The system for device communication identification according to claim 6, further comprising:
means for sending the unique serial number to a controller located within the device upon reading a unique serial number from the serial number area.

13. A computer program product, comprising:
instruction means for determining if a device has a serial number area initialized and instruction means for generating and storing a unique serial number in the serial number area when the serial number area is not initialized, wherein the serial number is thereafter used by the device for communication within the computer system.

14. The computer program product according to claim 13, further comprising:
instruction means for generating the unique serial number using a random number generator.

15. The computer program product according to claim 13, further comprising:
instruction means for generating the unique serial number using an internal clock located within the device.

16. The computer program product according to claim 13, further comprising:
instruction means for determining if the device has the serial number area initialized by executing code embedded in firmware located within the device.

17. The computer program product according to claim 13, further comprising:
instruction means for storing the unique serial number in flash ROM located within the device.

18. The method of claim 1, wherein the generating step further comprises using a random number generator to generate a unique serial number.

19. A system for dynamically assigning a unique serial number to a device communicatively coupled with a computer system, the system comprising:
a non volatile memory having a serial number storage area and an executable firmware program, the serial number storage area adapted to store a unique serial number for the device;
a volatile memory; and
a controller, wherein the controller fetches the firmware program in the non volatile memory, loads the firmware program in the volatile memory, executes the firmware program to establish a unique serial number for the device, and stores the unique serial number in the serial number storage area, wherein the serial number is thereafter used by the device for communication within the computer system.

20. The system of claim 19, further comprising:
a random number generator configured to generate the unique serial number.

21. The system of claim 19, further comprising;
an internal clock located within the device configured to generate the unique serial number.

22. The system of claim 19, further comprising:
flash ROM located within the device configured to store the unique serial number.

23. The system of claim 19, wherein the device is a modem conforming to a USB standard.

24. A computer readable medium having stored thereon one or more sequences of instructions for causing one or more microprocessors to perform the steps for dynamically assigning a unique serial number to a device communicatively coupled with a computer system, the steps comprising:
examining a serial number storage area located within the device to determine if a unique serial number has been established for the device;
responsive to a determination that no unique serial number has been established, generating a unique serial number based on a system clock associated with the device;
storing the serial number in the serial number storage area, wherein the serial number storage area is contained in a non volatile memory and the serial number is thereafter used by the device for communication within the computer system; and
sending the serial number to a controller located within the device.

25. The computer readable medium of claim 20, wherein the generating step further comprises using a random number generator to generate a unique serial number.

26. The computer readable medium of claim 20, wherein determining if the device has the serial number area initialized further comprises the step of:
executing code embedded in firmware located within the device.

27. The computer readable medium of claim 20, Her comprising the step of: storing the unique serial number in flash ROM located within the device.

28. The computer readable medium of claim 20, further comprising the step of:
utilizing a modem as the device whereby the modem conforms to a USB standard.

29. The computer readable medium of claim 20, further comprising the step of:
responsive to a determination that the serial umber area is initialized, reading a unique serial number from the serial number area and sending the unique serial number to a controller located within the device.

* * * * *